US012701375B2

(12) United States Patent
Christmas et al.

(10) Patent No.: US 12,701,375 B2
(45) Date of Patent: Aug. 4, 2026

(54) SYSTEMS AND METHODS FOR WIRELESS SURROUND SOUND

(71) Applicant: Fasetto, Inc., Scottsdale, AZ (US)

(72) Inventors: Coy Christmas, Scottsdale, AZ (US); Kevin Wilson, Trabuco Canyon, CA (US); Erik W. Jones, Ladera Ranch, CA (US)

(73) Assignee: Fasetto, Inc., Phoenix, AZ (US)

( * ) Notice: Subject to any disclaimer, the term of this patent is extended or adjusted under 35 U.S.C. 154(b) by 478 days.

(21) Appl. No.: 18/265,160

(22) PCT Filed: Dec. 3, 2021

(86) PCT No.: PCT/US2021/061812

§ 371 (c)(1),
(2) Date: Jun. 2, 2023

(87) PCT Pub. No.: WO2022/120170

PCT Pub. Date: Jun. 9, 2022

(65) Prior Publication Data

US 2024/0007812 A1 Jan. 4, 2024

Related U.S. Application Data

(60) Provisional application No. 63/121,783, filed on Dec. 4, 2020.

(51) Int. Cl.
*H04S 3/00* (2006.01)
*G06F 3/16* (2006.01)
(Continued)

(52) U.S. Cl.
CPC .............. *H04S 3/008* (2013.01); *G06F 3/162* (2013.01); *G06F 3/165* (2013.01); *G10L 19/008* (2013.01);
(Continued)

(58) Field of Classification Search
CPC ...... H04S 3/008; H04S 2400/01; G06F 3/162; G06F 3/165; G10L 19/008; G10L 19/173;
(Continued)

(56) References Cited

U.S. PATENT DOCUMENTS 7,920,932 B2 4/2011 Igoe
7,987,294 B2 7/2011 Bryce et al.
(Continued)

FOREIGN PATENT DOCUMENTS

EP 2425427 B1 9/2014
JP 2006162694 A 6/2006
(Continued)

OTHER PUBLICATIONS

Patent Cooperation Treaty, International Search Report and Written Opinion Received in International Application No. PCT/US2021/061812, dated Mar. 31, 2022.
(Continued)

*Primary Examiner* — Paul W Huber
(74) *Attorney, Agent, or Firm* — SNELL & WILMER L.L.P.

(57) ABSTRACT

A system for surround sound may comprise a user device, a control module, and a plurality of speakers. The system may receive an audio source data via a first interface. The system may transcode the audio source data to generate a transcoded audio data comprising a plurality of channels of audio information. The system may the plurality of channels of audio information from the transcoded audio data. The system may assign the plurality of channels of audio information to the plurality of speakers on a one-to-one basis. The system may stream, via a second interface, the plurality of channels of audio information to the plurality of speakers, wherein the second interface comprises a standard communication protocol operable on a physical layer protocol of the
(Continued)

100 second interface. The system may apply an effects function to at least one of the plurality of channels of audio information.

20 Claims, 4 Drawing Sheets

(51) Int. Cl.
| | |
|---|---|
| G10L 19/008 | (2013.01) |
| G10L 19/16 | (2013.01) |
| H04L 69/22 | (2022.01) |
| H04R 5/02 | (2006.01) |
| H04R 5/04 | (2006.01) |

(52) U.S. Cl.
CPC ............ *G10L 19/173* (2013.01); *H04L 69/22* (2013.01); *H04R 5/02* (2013.01); *H04R 5/04* (2013.01); *H04R 2420/07* (2013.01); *H04S 2400/01* (2013.01)

(58) Field of Classification Search
CPC .. H04L 69/22; H04R 5/02; H04R 5/04; H04R 2420/07
See application file for complete search history.

(56) References Cited

U.S. PATENT DOCUMENTS

| | | | |
|---|---|---|---|
| 8,325,935 | B2 | 12/2012 | Rutschman |
| 8,923,997 | B2* | 12/2014 | Kallai .................... H03G 5/165 |
| | | | 700/94 |
| 9,525,606 | B1 | 12/2016 | Staggs et al. |
| 9,820,048 | B2 | 11/2017 | Veeramani et al. |
| 10,985,850 | B1 | 4/2021 | Ichapurapu et al. |
| 11,758,232 | B2* | 9/2023 | Loritsch .................. G10L 15/22 |
| | | | 725/88 |
| 2002/0072816 | A1 | 6/2002 | Shdema et al. |
| 2003/0050989 | A1 | 3/2003 | Marinescu et al. |
| 2006/0233203 | A1 | 10/2006 | Iwamura |
| 2006/0245355 | A1 | 11/2006 | Iwamura |
| 2008/0071528 | A1 | 3/2008 | Ubale et al. |
| 2008/0234846 | A1 | 9/2008 | Malvar |
| 2008/0242222 | A1 | 10/2008 | Bryce et al. |
| 2008/0253575 | A1 | 10/2008 | Lorgeoux et al. |
| 2010/0106268 | A1 | 4/2010 | Howarter et al. |
| 2011/0309952 | A1 | 12/2011 | Gubbe et al. |
| 2012/0155670 | A1 | 6/2012 | Rutschman |
| 2012/0243690 | A1 | 9/2012 | Engdegard et al. |
| 2014/0278418 | A1 | 9/2014 | Chen et al. |
| 2015/0334504 | A1* | 11/2015 | Donaldson ............ G06F 3/0346 |
| | | | 381/307 |
| 2017/0094433 | A1 | 3/2017 | Mccarty et al. |
| 2017/0188151 | A1 | 6/2017 | Veeramani et al. |
| 2017/0238120 | A1 | 8/2017 | Milne et al. |
| 2018/0192171 | A1 | 7/2018 | Fang et al. |
| 2019/0157894 | A1 | 5/2019 | Shalaby et al. |
| 2019/0180764 | A1 | 6/2019 | Adami et al. |
| 2020/0015014 | A1* | 1/2020 | Takumai .................. H04R 5/02 |
| 2020/0304917 | A1 | 9/2020 | Ryu |
| 2020/0396542 | A1 | 12/2020 | Beckhardt |
| 2021/0012812 | A1 | 1/2021 | Yahata et al. |
| 2025/0337979 | A1* | 10/2025 | Rajapakse .......... H04N 21/6125 |

FOREIGN PATENT DOCUMENTS

| | | |
|---|---|---|
| JP | 2008295029 A | 12/2008 |
| JP | 2017188877 A | 10/2017 |
| KR | 20170092407 A | 8/2017 |
| KR | 20200040531 A | 4/2020 |
| RU | 2734231 C1 | 10/2020 |
| WO | 2009055220 A2 | 4/2009 |
| WO | 2014040667 A1 | 3/2014 |
| WO | 2015083653 A1 | 6/2015 |
| WO | 201762159 A1 | 4/2017 |
| WO | 2017135585 A2 | 8/2017 |
| WO | 2019204524 A1 | 10/2019 |

OTHER PUBLICATIONS

Russian Patent Office, Office Action Received in Application No. 2023115104, dated Dec. 17, 2024.

Japanese Patent Office, Notice of Reason for Rejection in Application No. 2023-534093, dated Oct. 24, 2025.

Hadas Ofir et al., Packet Loss Concealment for Audio Streaming based on the GAPES and MAPES Algorithms, Electrical and Electronics Engineers in Israel, 2006 IEEE 24th Convent ION of IEEE PI, Nov. 1, 2006.

Rowe, A, Gupta, V., & Rajkumar, R. (Nov. 2009). Low-power clock synchronization using electromagnetic energy radiating from ac power lines. In Proceedings of the 7th ACM Conference on Embedded Networked Sensor Systems (pp. 211-224) (Year: 2009).

Dieter, W. R., Datta, S., &Wong Key Kai. (2005). Power reduction by varying sampling rate. CiteSeerX(the Pennsylvania State University), https://doi.org/10.1145/1077603.1077658 (Year: 2005).

\* cited by examiner

100

300

400

| |
|---|
| IEEE 802.11<br>402 |
| SCP Header<br>404 |
| TCP/UDP<br>406 |
| SCP Message<br>408 |

FIG.4

SYSTEMS AND METHODS FOR WIRELESS SURROUND SOUND

CROSS REFERENCE TO RELATED APPLICATIONS

This application is the national stage entry of International Application Serial No. PCT/US2021/061812, filed Dec. 3, 2021, entitled SYSTEMS AND METHODS FOR WIRELESS SURROUND SOUND, which claims priority to and the benefit of, U.S. Provisional Application Ser. No. 63/121,783, filed on Dec. 4, 2020, and entitled "SYSTEMS AND METHODS FOR WIRELESS SURROUND SOUND," the contents of which is are incorporated by reference in their entirety.

FIELD

The disclosure relates generally to wireless speaker systems and, more particularly to wireless surround sound speaker systems.

BACKGROUND

Traditional surround sound speaker systems comprise a plurality of speakers which may be difficult to install, equalize, and operate in a home theater environment. Many of todays' high-end, at home, multi-speaker surround sound systems require cumbersome wires that need to be run throughout a room and connected with bulky receivers or pre-amplifiers. Consumer's demand for the best-quality audio while demanding spartan décor gave rise to soundbars, but soundbar systems do not deliver sufficient, high-quality audio. Furthermore, such systems are ill-suited for the advanced surround sound and effects found in high-end formats.

Thus, there is a need for a speaker system that is wireless connected and controllable to provide an exception sound experience.

SUMMARY

In various embodiments the present disclosure provides systems and methods for surround sound. The system may comprise a user device, a control module, and a plurality of speakers. The system may receive an audio source data via a first interface. The system may transcode the audio source data to generate a transcoded audio data comprising a plurality of channels of audio information. The system may the plurality of channels of audio information from the transcoded audio data. The system may assign the plurality of channels of audio information to the plurality of speakers on a one-to-one basis. The system may stream, via a second interface, the plurality of channels of audio information to the plurality of speakers, wherein the second interface comprises a standard communication protocol operable on a physical layer protocol of the second interface. The system may apply an effects function to at least one of the plurality of channels of audio information.

In various embodiments, at least one of the plurality of speakers includes a digital signal processer locally within the speaker. In various embodiments, the system may distribute a control command to at least one speaker of the plurality of speakers via the second interface. The system may prepend a standard communication protocol header to a packet or datagram to identify the packet or datagram as following the standard communication protocol.

In various embodiments, the system may recognize the standard communication protocol header. The system may identify, based on the recognition, a standard communication protocol message associated with the standard communication protocol header. The system may execute an action or instruction based on the standard communication protocol message. In various embodiments, the system may enable communications between the user device and the control module via a third interface. The system may transmit data to the user device via the third interface. The system may receive a control command from the user device via the third interface.

In various embodiments, the standard communication protocol defines the ability of each of the control module, the user device, and the plurality of speakers to discover one another, to request the transfer of raw data, to transmit confirmations on receipt of data, and to perform steps involved with transmitting data using at least one of the first interface or the second interface.

In various embodiments, the first interface is one of an audio or audio-visual interface and wherein the second interface is a wireless data interface. In various embodiments, the first interface comprises at least one of High-Definition Multimedia Interface (HDMI), DisplayPort, USB-C, AES3, AES47, S/PDIF, or BLUETOOTH®. In various embodiments, the second interface comprises at least one of IEEE 802.11, IEEE 802.15, or BLUETOOTH®. In various embodiments, the third interface comprises the standard communication protocol.

In various embodiments, a method for surround sound comprises receiving an audio source data via a first interface, transcoding the audio source data to generate a transcoded audio data comprising a plurality of channels of audio information, extracting the plurality of channels of audio information from the transcoded audio data, assigning the plurality of channels of audio information to a plurality of speakers on a one-to-one basis, streaming, via a second interface, the plurality of channels of audio information to the plurality of speakers, wherein the second interface comprises a standard communication protocol operable on a physical layer protocol of the second interface, and applying an effects function to at least one of the plurality of channels of audio information.

In various embodiments the method includes distributing a control command to at least one speaker of the plurality of speakers via the second interface. The method may include prepending a standard communication protocol header to a packet or datagram to identify the packet or datagram as following the standard communication protocol. In various embodiments, the method includes recognizing the standard communication protocol header, identifying, based on the recognition, a standard communication protocol message associated with the standard communication protocol header, and executing an action or instruction based on the standard communication protocol message. In various embodiments, the method includes enabling communications between the user device and the control module via a third interface, transmitting data to the user device via the third interface, and receiving a control command from the user device via the third interface.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 4 illustrates a data control scheme in a system for surround sound, in accordance with various embodiments.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
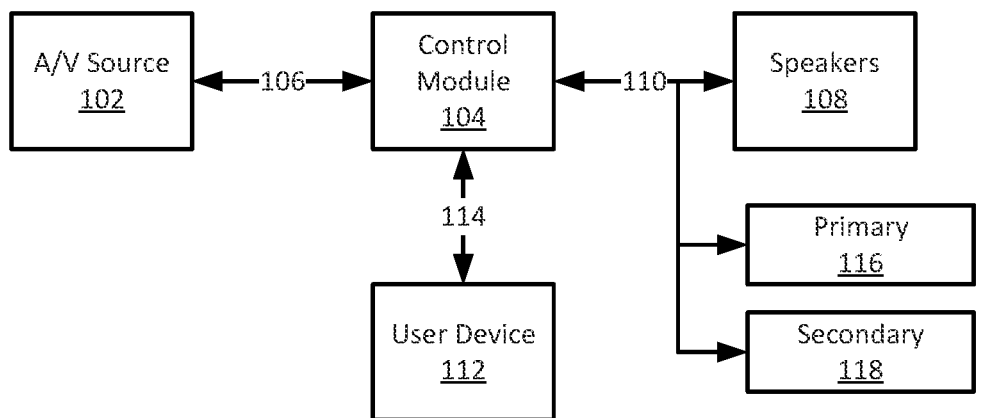
FIG. 1 is a block diagram illustrating various system components of a system for surround sound, in accordance with various embodiments.

In various embodiments and with reference to FIG. 1, an exemplary system 100 for wireless surround sound is illustrated. System 100 may include an audio/visual source (A/V source) 102, a control module 104, a plurality of wireless speakers 108, and a user device 112. The speakers 108 include at least one primary speaker 116 (e.g., a front speaker) and a secondary speaker 118 such as, for example, a subwoofer or a rear speaker. The speakers 108 are described in more detail below and with reference to FIG. 3.

In various embodiments, control module 104 may be configured as a central network element or hub to access various systems, engines, and components of system 100. Control module 104 may be a computer-based system, and/or software components configured to provide an access point to various systems, engines, and components of system 100. Control module 104 may be in communication with the A/V source 102 via a first interface 106. The control module may be in communication with the speakers 108 via a second interface 110. The control module 104 may be in communication with the user device 112 via a third interface 114. In this regard, the control module 104 may allow communications from the user device 112 to the various systems, engines, and components of system 100 (such as, for example, speakers 108 and/or A/V source 102). In this regard, the system may transmit a high definition audio signal along with data (e.g., command and control signals, etc.) to any type or number of speakers configured to communicate with the control module 104.

In various embodiments the first interface 106 may be an audio and/or visual interface such as, for example, High-Definition Multimedia Interface (HDMI), DisplayPort, USB-C, AES3, AES47, S/PDIF, BLUETOOTH®, and/or the like. In various embodiments, any of the first interface 106, the second interface 110, and/or the third interface 114 may be a wireless data interface such as, for example, one operating on a physical layer protocol such as IEEE 802.11, IEEE 802.15, BLUETOOTH®, and/or the like. As described in further detail below, each of the various systems, engines, and components of system 100 may be further configured to communicate via the GRAVITY Standardized Communication Protocol (SCP) for wireless devices operable on the physical layer protocol as described in further detail below that is being offered by Fasetto, Inc. of Scottsdale, Arizona. In various embodiments, each of the first interface 106, the second interface 110, and the third interface 114 may differ. For example the first interface 106 may comprise HDMI, the second interface 110 may comprise an IEEE 802.11 interface, and the third interface 114 may comprise a BLUETOOTH® interface. In various embodiments, the first interface may differ from the second and the third interface. For example, the first interface 106 may comprise USB-C, the second interface 110 may comprise an IEEE 802.11 interface, and the third interface 114 may comprise an IEEE 802.11 interface.

In various embodiments, a user device 112 may comprise software and/or hardware in communication with the system 100 via the third interface 114 comprising hardware and/or software configured to allow a user, and/or the like, access to the control module 104. The user device may comprise any suitable device that is configured to allow a user to communicate via the third interface 114 and the system 100. The user device may include, for example, a personal computer, personal digital assistant, cellular phone, a remote control device, and/or the like and may allow a user to transmit instructions to the system 100. In various embodiments, the user device 112 described herein may run a web application or native application to communicate with the control module 104. A native application may be installed on the user device 112 via download, physical media, or an app store, for example. The native application may utilize the development code base provided for use with an operating system of the user device 112 and be capable of performing system calls to manipulate the stored and displayed data on the user device 112 and communicates with control module 104. In this regard, the control module 104 may transmit data to the user device 112 via the third interface 114. Similarly, the control module 104 may receive control commands from the user device 112 via the third interface 114. A web application may be web browser compatible and written specifically to run on a web browser. The web application may thus be a browser-based application that operates in conjunction with the system 100.

Figure 2:
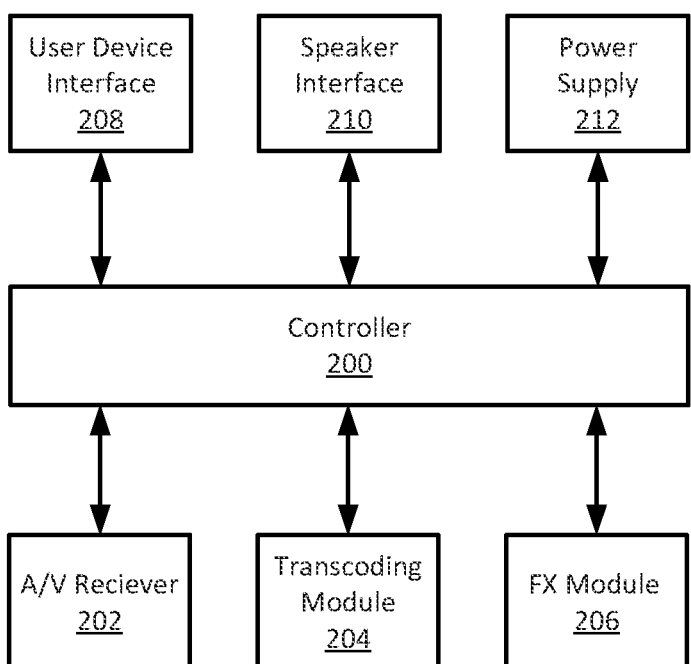
FIG. 2 is a block diagram of a control module in a system for surround sound, in accordance with various embodiments.

In various embodiments and with additional reference to FIG. 2, control module 104 is illustrated. Control module 104 may include a controller 200, an A/V receiver 202, a transcoding module 204, an effects processing module (FX module) 206, a user device interface 208, a speaker interface 210 (such as, for example, a transmitter or transceiver), and a power supply 212.

In various embodiments, controller 200 may comprise a processor and may be configured as a central network element or hub to access various systems, engines, and components of system 100. In various embodiments, controller 200 may be implemented in a single processor. In various embodiments, controller 200 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 200 may comprise a processor configured to implement various logical operations in response to execution of instructions, for example, instructions stored on a non-transitory, tangible, computer-readable medium configured to communicate with controller 200.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments the A/V receiver 202 is configured to receive source audio data from the A/V source 102 via the first interface 106. Controller 200 may pass the source audio data to the transcoding module 204 for further processing. In various embodiments, the transcoding module 204 is configured to perform conversion operations between a first encoding and a second encoding. For example, transcoding module 204 may convert the source audio from the first encoding to the second encoding to generate a transcoded audio data for further processing by the FX module 206. In various embodiments, the transcoding module 204 may be configured to decode and/or transcode one or more channels of audio information contained within the source audio data such as, for example, information encoded as Dolby Digital, DTS, ATMOS, Sony Dynamic Digital Sound (SDDS), and/or the like. In this regard, the transcoding module 204 may generate a transcoded audio data comprising a plurality of channels of audio information which may be further processed by the system.

In various embodiments, the FX module 206 may comprise one or more digital signal processing elements or may be configured to adjust the balance between frequency components of the transcoded audio data. In this regard the FX module 206 may behave as an equalization module strengthen or weaken the energy of one or more frequency bands within the transcoded audio data. In various embodiments, the FX module 206 may include one or more filtering elements such as, for example, band-pass filters configured to eliminate or reduce undesired and/or unwanted elements of the source audio data. Similarly, the FX module may include one or more effects elements and/or effects functions configured to alter the transcoded audio data. For example, the effects functions may enhance the data quality of the transcoded audio data, may correct for room modes, may apply distortion effects, dynamic effects, modulation, pitch/frequency shifting, time-based, feedback, sustain, equalization, and/or other effects. In various embodiments, the FX module may be software defined and/or may be configured to receive over-the-air updates. In this regard, the system may enable loading of new and/or user defined effects functions. In various embodiments, the FX module 206 may be configured to apply any number of effects functions to the transcoded audio data to generate a desired effected audio data comprising the channels of audio information. Controller 200 may pass the effected audio data to the speaker interface 210.

In a preferred embodiment and as discussed below with brief additional reference to FIG. 3, the FX module 206 functionality may be subsumed by a digital signal processor (DSP) 306 of each of the plurality of speakers 300. In this regard and in the preferred embodiment, the size and complexity of the control module 104 may be reduced by implementing the software defined FX module functionality via the DSP locally within one or more of the plurality of speakers 300.

In various embodiments, the speaker interface 210 may be configured to communicate via the second interface 110 with the plurality of speakers 108. In various embodiments, the speaker interface 210 may comprise a plurality of communication channels each of which are associated with a speaker of the plurality of speakers 108. The controller 200 may assign each of the channels of audio information to the plurality of speakers 108. For example, the speaker interface 210 may assign a first channel of the effected audio data to a communication channel for the primary speaker 116 and may assign a second channel of the effected audio data to a communication channel for the secondary speaker 118. In this regard, the system may assign the plurality of channels of audio information to the plurality of speakers on a one-to-one basis. Thereby the speaker interface 210 may facilitate streaming, by the processor, the various channels of audio information to the speakers. In various embodiments, the speaker interface 210 may be further configured to distribute instructions (e.g., control commands) to the speakers.

In various embodiments, the user device interface 208 is configured to enable communication between the controller 200 and the user device 112 via the third interface 114. The user device interface 208 may be configured to receive control commands from the user device 112. The user device interface 208 may be configured to return command confirmations or to return other data to the user device 112. For example, the user device interface 208 may be configured to return performance information about the control module 104, the effected audio data, speaker interface 210 status, speakers 108 performance or status, and/or the like. In various embodiments, the user device interface 208 may be further configured to receive source audio data from the user device 112.

In various embodiments, the power supply 212 is configured to receive electrical power. The power supply 212 may be further configured to distribute the received electrical power to the various components of system 100.

Figure 3:
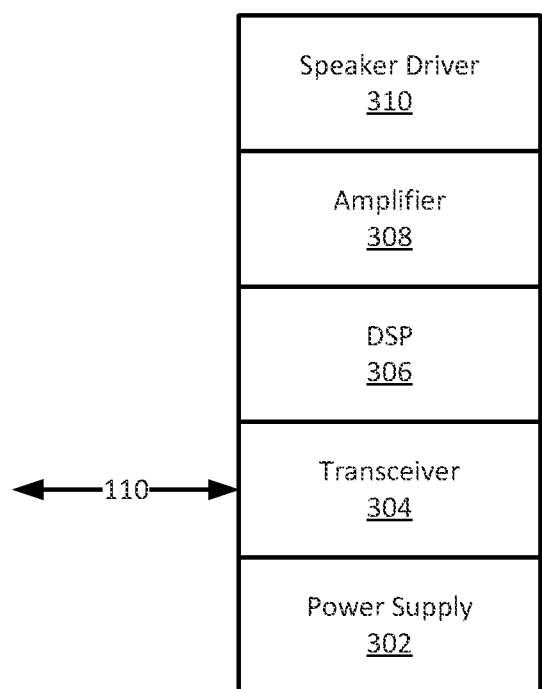
FIG. 3 is a block diagram of a wireless speaker in a system for surround sound, in accordance with various embodiments.

In various embodiments and with additional reference to FIG. 3, an exemplary speaker 300 of the plurality of speakers 108 is illustrated. Speaker 300 includes a power supply 302 configured to receive electrical power and distribute the electrical power to the various components of speaker 300. Speaker 300 may further comprise a transceiver 304, a digital signal processor (DSP) 306, an amplifier 308, and a speaker driver 310. In various embodiments, transceiver 304 is configured to receive the assigned channel of audio information and the control commands from the control module 104 via the second interface 110. In various embodiments, the transceiver may be further configured to pass status information and other data about the speaker 300 to the control module 104. In various embodiments, the transceiver 304 may be configured to communicate directly with the user device 112.

In various embodiments, the DSP 306 may be configured receive the assigned channel of audio and apply one or more digital signal processing functions, such as, for example sound effect algorithms, to the audio data. In this regard, the DSP 306 may perform further effect functions to audio data which has already been proceed by the FX module 206. In various embodiments, the DSP 306 may perform further processing in response to commands from the control module 104. For example, the control module may command the DSP to apply processing functions to equalize the speaker 300 output based on its particular location within a room, to emulate a desired room profile, to add one or more effectors (e.g., reverb, echo, gate, flange, chorus, etc.), and/or the like. As discussed above, in a preferred embodiment the DSP 306 may include and implement all the functionality of the FX module 206 which may be software defined. In this regard, the DSP 306 may generate a DSP audio channel which may be passed to the amplifier 308 for further processing. The amplifier 308 may receive the DSP audio channel and may amplify the signal strength of the DSP audio channel to generate a drive signal which may be passed to the speaker driver 310. In various embodiments, the speaker driver 310 may receive the a drive signal from the amplifier 308 and in response convert the drive signal to sound.

As discussed above and with additional reference to FIG. 4, a schematic diagram of a data control scheme for wireless surround sound is illustrated. In various embodiments, each of the user device 112, the A/V Source 102, the control module 104, and the speakers 108 may be further configured to communicate via the SCP. In various embodiments, the SCP may comprise a network layer protocol. In various embodiments, system may prepend an SCP header 404 to a packet or datagram 400 to identify the packet or datagram as following the SCP. In this regard the SCP header may be interposed between the physical layer communication protocol 402 (e.g, 802.11, 802.15, etc.) data and a transport layer protocol 406 (e.g., TCP/IP, UDP, DCCP, etc.) data. The system 100 elements may be configured to recognize the SCP header 404 to identify an associated SCP message 408. The system may then execute various actions or instructions based on the SCP message 408.

For example, the SCP may define the ability of devices (such as, for example, the speakers 108, the control module 104, and the user device 112) to discover one another, to request the transfer of raw data, to transmit confirmations on receipt of data, and to perform steps involved with transmitting data. The SCP may define various control commands to the speaker 300 to switch or apply the various DSP functions, to turn on or off the power supply 302, to affect the signal strength output by the amplifier 308, and/or the like. In various embodiments, the SCP may define the ability of the control module 104 to alter the effects functions of the FX module 206 and/or the DSP 306, to select codes of the transcoding module 204, to select audio source data, to power on or off the power supply 212, to assign or modify interfaces of the speaker interface 210, and or the like. In this regard, as implemented in s system 100 the SCP enables discrete control over each of the plurality of speakers 300 in real time to deploy audio signal processing functions to selected individual speakers (e.g., primary 116) or groups of speakers (e.g., primary speaker 116 and secondary speaker 118) such as, for example, frequency-shaping, dialogue-enhancement, room mode correction, effects functions, equalization functions, tone control, balance, level and volume control, etc. System 100 thereby enables individualized control of the sound output characteristics of speakers 300. In various embodiments, the control commands may be received by the control module 104 from the user device 112 via third interface 114 or may be received directly by the speakers 108.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for surround sound comprising:
a user device;
a central network element; and
a plurality of speakers,
wherein the central network element comprises a processor and a tangible, non-transitory memory configured to communicate with the processor, the tangible, non-transitory memory having instructions stored thereon that, in response to execution by the processor, cause the central network element to perform operations comprising:
    receiving, from an A/V source and by the processor, an audio source data via a first interface;
    transcoding, by the processor, the audio source data to generate a transcoded audio data comprising a plurality of channels of audio information;
    extracting, by the processor, the plurality of channels of audio information from the transcoded audio data;
    assigning, by the processor, the plurality of channels of audio information to the plurality of speakers on a one-to-one basis; and
    streaming, by the processor and via a second interface different from the first interface, the plurality of channels of audio information to the plurality of speakers, wherein the plurality of channels of audio information streamed over the second interface comprise a physical layer protocol followed by a standard communication protocol header, followed by a transport layer protocol, followed by a standard communication protocol message and wherein the standard communication protocol message causes a digital signal processor connected via the second interface to apply an effects function to at least one of the plurality of channels of audio information before output by a speaker of the plurality of speakers.

2. The system of claim 1, wherein at least one speaker of the plurality of speakers includes the digital signal processor locally within the at least one speaker.

3. The system of claim 1, wherein the operations further comprise:
distributing, by the processor, a control command to at least one speaker of the plurality of speakers via the second interface.

4. The system of claim 1, wherein the standard communication protocol header identifies the plurality of channels of audio information as following a standard communication protocol.

5. The system of claim 4, wherein the standard communication protocol defines an ability of each of the central network element, the user device, and the plurality of speakers to discover one another, to request transfer of data, to transmit confirmations on receipt of data, and to perform steps involved with transmitting data using at least one of the first interface or the second interface.

6. The system of claim 1, wherein the physical layer protocol comprises at least one of IEEE 802.11 or IEEE 802.15 and the transport layer protocol comprises at least one of TCP/IP, UDP, or DCCP.

7. The system of claim 1, wherein the operations further comprise:
enabling, by the processor, communications between the user device and the central network element via a third interface;

transmitting, by the processor, data to the user device via the third interface; and
receiving, by the processor, a control command from the user device via the third interface.

8. The system of claim 7, wherein the third interface comprises a web application or a native application utilizing the standard communication protocol header.

9. A method comprising:
receiving, from an A/V source and by a processor, an audio source data via a first interface;
transcoding, by the processor, the audio source data to generate a transcoded audio data comprising a plurality of channels of audio information;
extracting, by the processor, the plurality of channels of audio information from the transcoded audio data;
assigning, by the processor, the plurality of channels of audio information to a plurality of speakers on a one-to-one basis; and
streaming, by the processor and via a second interface different from the first interface, the plurality of channels of audio information to the plurality of speakers, wherein the plurality of channels of audio information streamed over the second interface comprise a physical layer protocol followed by a standard communication protocol header, followed by a transport layer protocol, followed by a standard communication protocol message and wherein the standard communication protocol message causes a digital signal processor connected via the second interface to apply an effects function to at least one of the plurality of channels of audio information before output by a speaker of the plurality of speakers.

10. The method of claim 9, further comprising:
distributing, by the processor, a control command to at least one speaker of the plurality of speakers via the second interface.

11. The method of claim 9,
wherein the standard communication protocol header identifies the plurality of channels of audio information as following a standard communication protocol.

12. The method of claim 11, further comprising:
enabling, by the processor, communications between a user device and a central network element via a third interface;
transmitting, by the processor, data to the user device via the third interface; and
receiving, by the processor, a control command from the user device via the third interface.

13. The method of claim 12, wherein the third interface comprises a web application or a native application utilizing the standard communication protocol header.

14. The method of claim 9, wherein the physical layer protocol comprises at least one of IEEE 802.11 or IEEE 802.15 and the transport layer protocol comprises at least one of TCP/IP, UDP, or DCCP.

15. An article of manufacture including a non-transitory, tangible computer readable storage medium having instructions stored thereon that, in response to execution by a processor, cause the processor to perform operations comprising:
receiving, from an A/V source and by the processor, an audio source data via a first interface;
transcoding, by the processor, the audio source data to generate a transcoded audio data comprising a plurality of channels of audio information;
extracting, by the processor, the plurality of channels of audio information from the transcoded audio data;

assigning, by the processor, the plurality of channels of audio information to a plurality of speakers on a one-to-one basis; and streaming, by the processor and via a second interface different from the first interface, the plurality of channels of audio information to the plurality of speakers, wherein the plurality of channels of audio information streamed over the second interface comprise a physical layer protocol followed by a standard communication protocol header, followed by a transport layer protocol, followed by a standard communication protocol message and wherein the standard communication protocol message causes a digital signal processor connected via the second interface to apply an effects function to at least one of the plurality of channels of audio information before output by a speaker of the plurality of speakers.

16. The article of manufacture of claim 15, wherein the operations further comprise:

distributing, by the processor, a control command to at least one speaker of the plurality of speakers via the second interface.

17. The article of manufacture of claim 15, wherein the operations further comprise:

standard communication protocol header identifies the plurality of channels of audio information as following a standard communication protocol.

18. The article of manufacture of claim 15, wherein the operations further comprise:

enabling, by the processor, communications between a user device and a central network element via a third interface;

transmitting, by the processor, data to the user device via the third interface; and receiving, by the processor, a control command from the user device via the third interface.

19. The article of manufacture of claim 18, wherein the third interface comprises a web application or a native application utilizing the standard communication protocol header.

20. The article of manufacture of claim 15, wherein the physical layer protocol comprises at least one of IEEE 802.11 or IEEE 802.15 and the transport layer protocol comprises at least one of TCP/IP, UDP, or DCCP.

\* \* \* \* \*